US008357283B2

(12) United States Patent
Kao

(10) Patent No.: US 8,357,283 B2
(45) Date of Patent: Jan. 22, 2013

(54) ELECTRIC SEPARATING APPARATUS

(76) Inventor: Tze-Ming Kao, Taipei (TW)

( * ) Notice: Subject to any disclaimer, the term of this patent is extended or adjusted under 35 U.S.C. 154(b) by 643 days.

(21) Appl. No.: 12/584,543

(22) Filed: Sep. 8, 2009

(65) Prior Publication Data

US 2011/0056835 A1 Mar. 10, 2011

(51) Int. Cl.
*B01D 17/06* (2006.01)

(52) U.S. Cl. .......................... 204/661; 204/666; 204/673

(58) Field of Classification Search .................. 204/666, 204/673, 661

See application file for complete search history.

(56) References Cited

U.S. PATENT DOCUMENTS 3,939,395 A * 2/1976 Prestridge et al. ............ 323/235
4,400,253 A * 8/1983 Prestridge et al. ............ 204/555
4,919,777 A * 4/1990 Bull .............................. 204/563
7,163,624 B2 * 1/2007 Nilsen et al. .................. 210/243

* cited by examiner

*Primary Examiner* — Patrick Ryan
*Assistant Examiner* — William Leader
(74) *Attorney, Agent, or Firm* — Charles E. Baxley

(57) ABSTRACT

An electric separating apparatus has a separating tank and an electrical control. The separating tank has at least one first electrode panel, a second electrode panel, an upper separating region and a lower separating region. The electrode panels are vertically mounted in the separating tank to form the separating regions. The electrical control is electrically connected to the separating tank and has a transformer, a high-power resistor, a first A/C transformer, a second A/C transformer and a control unit. The transformer is electrically connected to an A/C source and the electrode panels. The high-power resistor is electrically connected to the transformer and the at least one first electrode panel in series. The A/C transformers are respectively connected to the high-power resistor and the electrode panels. The control unit is electrically connected to the A/C transformers to determine an electrical impedance of a liquid mixture in the tank.

7 Claims, 4 Drawing Sheets

ELECTRIC SEPARATING APPARATUS

BACKGROUND OF THE INVENTION

1. Field of the Invention

The present invention relates to an electric separating apparatus, and more particularly relates to an electric separating apparatus that can be operated to separate glycerol from bio-diesel oil quickly.

2. Description of Related Art

As cost of extracting petroleum and increased competition over the same resource causes increased higher end user prices, study and development of new energy sources to replace petroleum is becoming more frequent. Bio-diesel is an equivalent replacement for many uses of petroleum, but bio-diesel still requires mixing with petroleum derived diesel fuel. Further, bio-diesel can reduce air pollution when mixed with standard diesel fuel since sulfur is not present in bio-diesel.

In addition, bio-diesel is a reaction product by transesterification of methanol and plant oil with sodium hydroxide catalyst. Plant oil consists mainly of triglyceride so a liquid mixture of bio-diesel and glycerol is formed. The specific gravity of the glycerol is larger than the specific gravity of the bio-diesel so the liquid mixture can be left to stand to separate the bio-diesel from atop a glycerol layer. However, such process is time-consuming.

Alternatively, a conventional centrifugal separator can be used to separate the glycerol from the liquid mixture. However, energy and investment costs of the conventional centrifugal separator along with component complexity renders such method inefficient. Further, different sized tanks are needed according to the volume of the transesterification reaction.

Therefore, the present invention provides an electric separating apparatus to mitigate or obviate the aforementioned problems.

SUMMARY OF THE INVENTION

The main objective of the present invention is to provide an electric separating apparatus that can be operated to separate the glycerol from the bio-diesel oil quickly.

The electric separating apparatus in accordance with the present invention has a separating tank and an electrical control. The separating tank has at least one first electrode panel, a second electrode panel, an upper separating region and a lower separating region. The electrode panels are vertically mounted in the separating tank to form the separating regions. The electrical control is electrically connected to the separating tank and has a transformer, a high-power resistor, a first A/C transducer, a second A/C transducer and a control unit. The transformer is electrically connected to an A/C source and the electrode panels. The high-power resistor is electrically connected to the transformer and the at least one first electrode panel in series. The A/C transducers are respectively connected to the high-power resistor and the electrode panels. The control unit is electrically connected to the A/C transducers to determine an electrical impedance of a mixture liquid in the tank.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
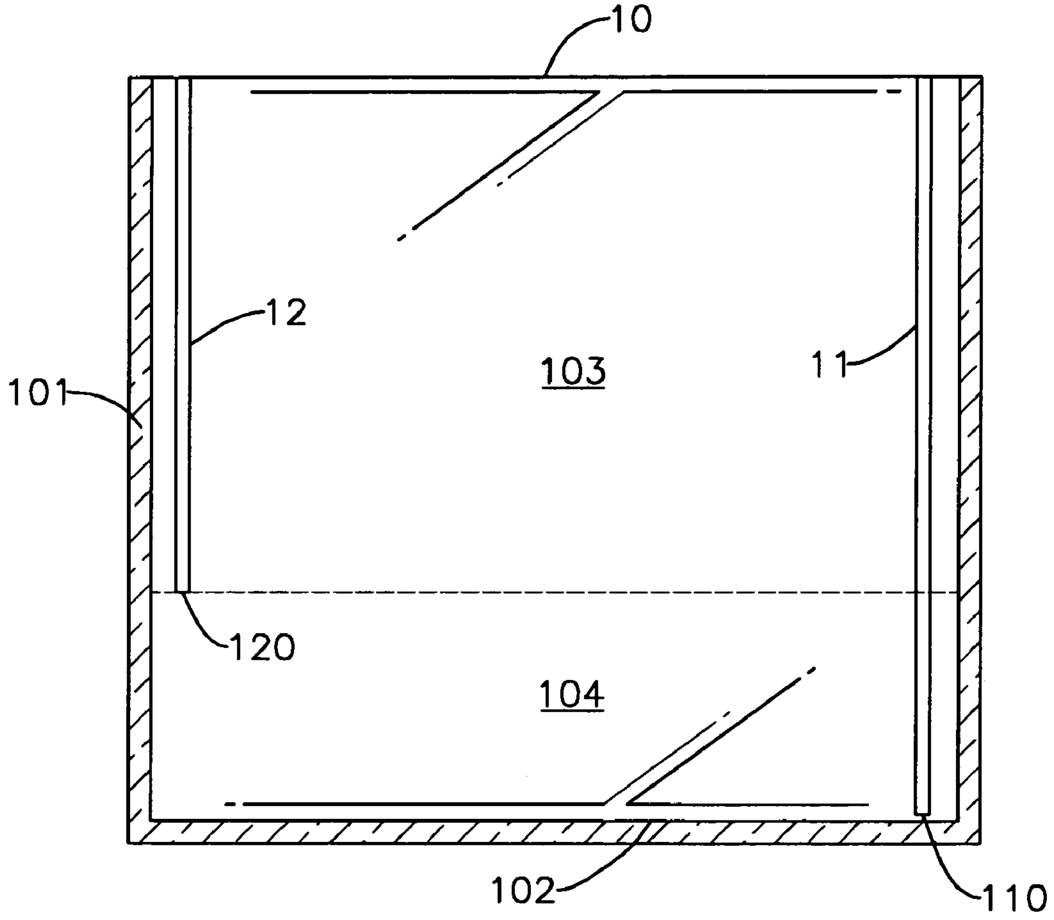
FIG. 1 is a side view in partial section of a first embodiment of an electric separating apparatus in accordance with the present invention.
Figure 3:
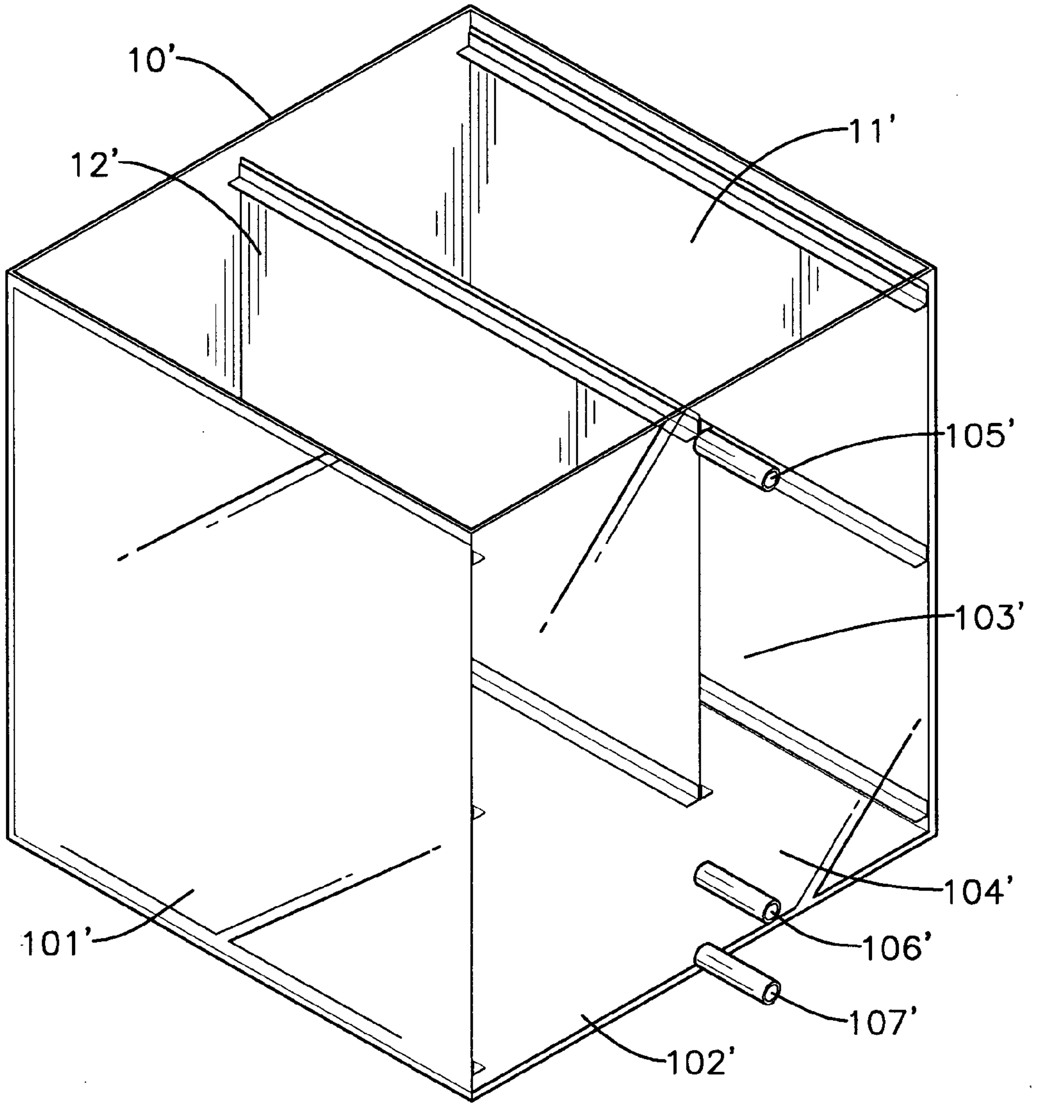
FIG. 3 is a perspective view of a second embodiment of an electric separating apparatus in accordance with the present invention.

With reference to FIGS. 1 and 3, an electric separating apparatus in accordance with the present invention has a separating tank (10, 10') and an electrical control.

The separating tank (10, 10') has multiple sidewalls (101, 101'), a bottom (102, 102'), an opening, at least one first electrode panel (11, 11'), a second electrode panel (12, 12'), an upper separating region (103, 103') and a lower separating region (104, 104'). The sidewalls (101, 101') are formed with each other and each sidewall (101, 101') has a height, a bottom edge and a top edge. The bottom (102, 102') is formed on the bottom edges of the sidewalls (101, 101') to form a volume for storing the liquid mixture made by transesterification. The opening is formed between the top edges of the sidewalls (101, 101').

The at least one first electrode panel (11, 11') is mounted in the separating tank (10, 10') from the opening and each first electrode panel (11, 11') has a height, an upper edge and a lower edge. The height of the first electrode panel (11, 11') is smaller than the height of the sidewalls (101, 101'). The upper edge of the first electrode panel (11, 11') is mounted near the opening of the separating tank (10, 10'). The lower edge of the first electrode panel (11, 11') is mounted near the bottom (102, 102') of the separating tank (10, 10'). Preferably, two first electrode panels (11') are mounted in the tank (10').

The second electrode panel (12, 12') is mounted in the separating tank (10, 10') from the opening parallel to the at least one first electrode panel (11, 11') at an interval and has a height, an upper edge and a lower edge. The height of the second electrode panel (12, 12') is smaller than that of the at least one first electrode panel (11, 11'). Preferably, the interval between the electrode panels (11, 11', 12, 12') is 200 millimeter (mm). Preferably, the second electrode panel (12') is mounted in the tank (12') between the two first electrode panels (11').

The upper separating region (103, 103') is formed in the separating tank (10, 10') between the upper edges of the electrode panels (11, 11', 12, 12') and the lower edge of the second electrode panel (12, 12'). The lower separating region (104, 104') is formed in the separating tank (10, 10') between the lower edge of the second electrode panel (12, 12') and the bottom (102, 102') of the separating tank (10, 10').

The separating tank (10') further has an inlet pipe (105'), a bio-diesel outlet (106') and a glycerol outlet (107'). The inlet pipe (105') is mounted on one of the sidewalls (102') of the separating tank (10') near the opening, communicates with the separating regions (103', 104') of the separating tank (10') and is used to inject the liquid mixture made by transesterification into the separating tank (10'). The bio-diesel outlet (106') is mounted on the corresponding sidewall (102') near the lower edge of the second electrode panel (12') and communicates with the upper separating region (103'). The glycerol outlet (107') is mounted on the corresponding sidewall (102') below the bio-diesel outlet (106') and communicates with the lower separating region (104').

Figure 2:
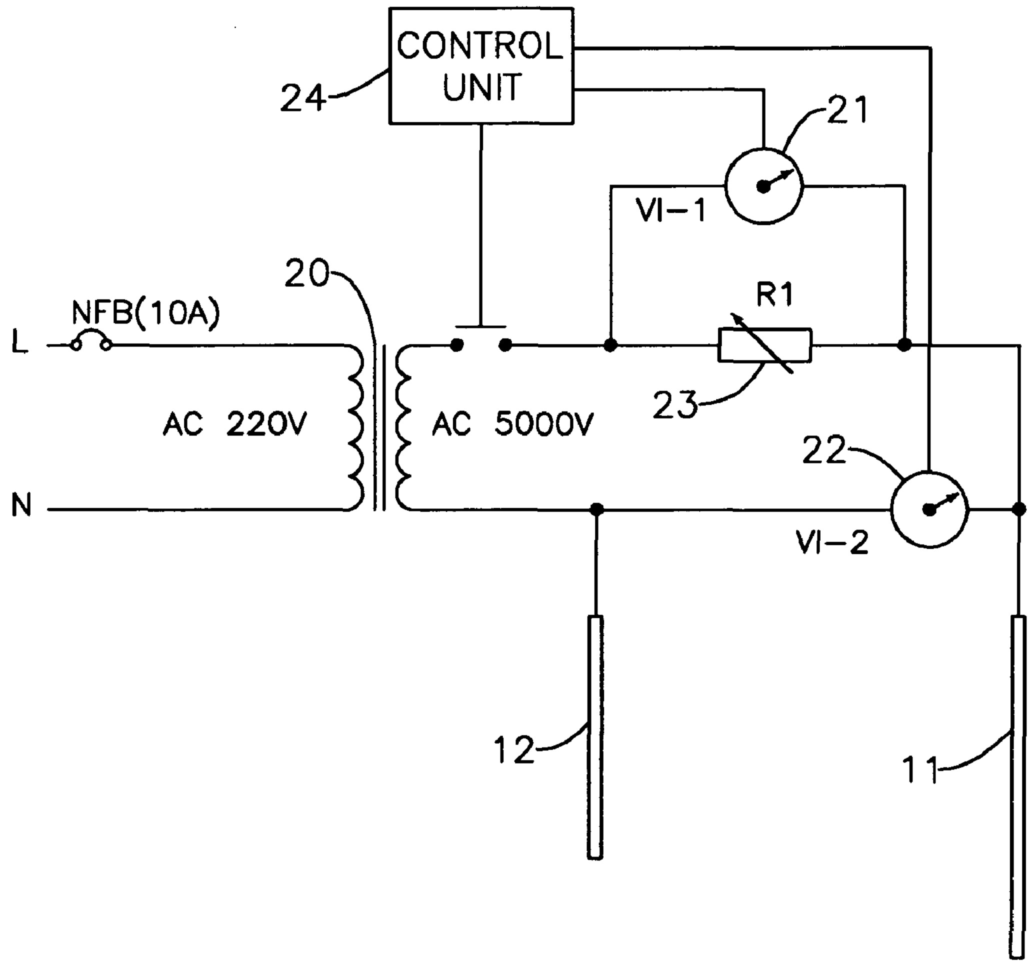
FIG. 2 is a circuit diagram of the electrical control of the electric separating apparatus in FIG. 1.
Figure 4:
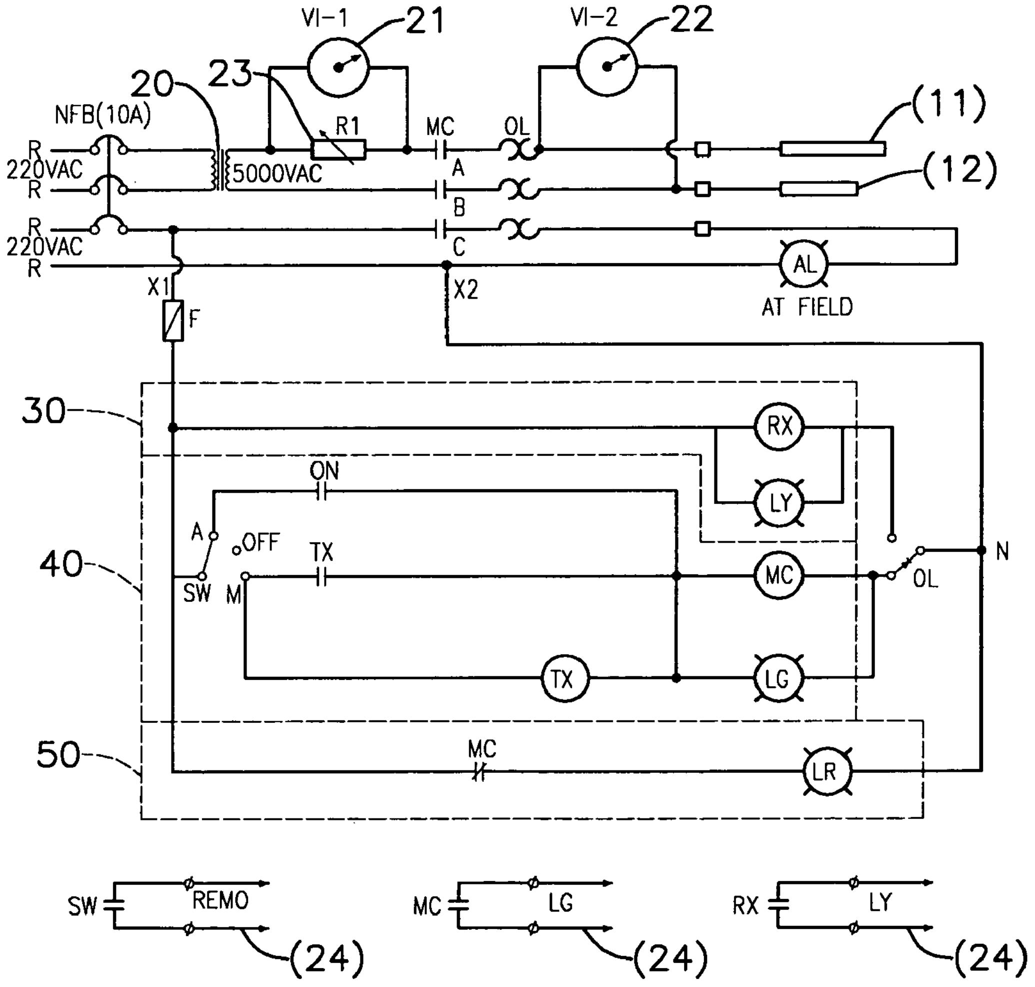
FIG. 4 is a circuit diagram of the electrical control of the electric separating apparatus in FIG. 3.

With reference to FIGS. 2 and 4, the electrical control is electrically connected to the separating tank (10, 10') and has a transformer (20), a high-power resistor (23), a first A/C transducer (21), a second A/C transducer (22) and a control unit (24).

The transformer (20) is electrically connected to an A/C source and the electrode panels (11, 11', 12, 12') and has a first side and a second side. The first side of the transformer (20) is electrically connected to the A/C source providing a voltage of 220 V. The second side of the transformer (20) is electrically connected to the electrode panels (11, 11', 12, 12') to step the voltage between the electrode panels (11, 11', 12, 12') up to 1000 V. The high-power resistor (R1) (23) is electrically connected to the second side of the transformer (20) and the at least one first electrode panel (11, 11') in series and has two ends and an ohm value between 1 kΩ and 20 kΩ.

The first A/C transducer (21) is electrically connected to the ends of the high-power resistor (23) to detect a voltage between the ends of the high-power resistor (23) and transfer the alternating current to a continuous current (V1-1).

The second A/C transducer (22) is electrically connected to the electrode panels (11, 11', 12, 12') in series to detect the voltage between the electrode panels (11, 11', 12, 12') and transfer the alternating current to a continuous current (V1-2).

The control unit (24) has a normally open contact (ON) and is electrically connected to the A/C transducers (21, 22) to determine an electrical impedance (R0) of the liquid mixture in the tank (10, 10') by receiving the continuous currents between the A/C transducers (21, 22) and selectively supplying power to the transformer (20). The electrical impedance (R0) of the liquid mixture can be calculated by the following formula:

$$R0=V1-2/V1-1*R1.$$

When electrifying the electrode panels (11, 11', 12, 12') to separate the liquid mixture in the tank (10, 10'), the glycerol which has a larger specific gravity than the bio-diesel will separate from the liquid mixture and precipitate in the lower separating region (104, 104') of the tank (10, 10') and the bio-diesel will separate and suspend in the upper separating region (103, 103') of the tank (10, 10') The glycerol is conductive and the bio-diesel is non-conducting. When the bio-diesel is suspended in the upper separating region (103, 103') of the tank (10, 10'), the electrical impedance (R0) of the liquid mixture will be increased. When the electrical impedance (R0) of the liquid mixture can not be increased, the glycerol has been separated from the bio-diesel in the tank (10, 10') and the control unit (24) will cut off the power supply.

With further reference to FIG. 4, the electrical control further has a thermal relay (OL), a magnetic contactor (MC), an acousto-optic alarm (AL), a fault indication circuit (30), a magnetic contactor circuit (40) and a power supply indication circuit (50).

The thermal relay (OL) and magnetic contactor (MC) are electrically connected to the second side of the transformer (20) and the electrode panels (11', 12') in series.

The thermal relay (OL) has a normally closed contact.

The magnetic contactor (MC) has two ends, three contact segments and a normally closed contact. Two of the contact segments of the magnetic contactor (MC) are connected to the second side of the transformer (20).

The acousto-optic alarm (AL) is connected to the other contact segment of the magnetic contactor (MC). When electrifying between the electrode panels (11', 12'), the acousto-optic alarm (AL) can provide a sound and a light to inform people to stand a safe distance away.

The fault indication circuit (30) is electrically connected to the N pole of the A/C source by a middle relay (RX) and the normally closed contact of the thermal relay (OL) and has a coil and a yellow indicator light (LY). The yellow indicator light (LY) is electrically connected to the middle relay (RX). When the coil of the middle relay (RX) is excited, the fault indication circuit (30) will send a signal to the control unit (24).

The magnetic contactor circuit (40) is electrically connected to the fault indication circuit (30) and has a switch (SW). The switch (SW) has three contacts. The contacts of the switch (SW) are respectively an automation contact, an off contact and a manipulating contact to represent the automation condition (A), the off condition (OFF) and the manipulating condition (M).

The automation contact of the switch (SW) is electrically connected to the N pole of the A/C source by the normally open contact (ON) of the control unit (24), the magnetic contactor (MC) and the normally closed contact of the thermal relay (OL). When the switch (SW) is operated in the automation condition (A), an automatic signal (REMO) will be sent to the control unit (24) to selectively supply electricity to the magnetic contactor (MC).

The off contact of the switch (SW) is electrically connected to the N pole of the A/C source by a normally open contact (ON) of a time-delay relay (TX), the magnetic contactor (MC) and the normally closed contact of the thermal relay (OL). Furthermore, a green operation indication lamp (LG) is electrically connected to the ends of the magnetic contactor (MC). When the switch (SW) is operated in the off condition (OFF), the magnetic contactor (MC) is cut off the power supply by the control unit (24).

When the switch (SW) is operated in the manipulating condition (M), the time-delay relay (TX) is powered by the A/C source and the normally open contact (ON) of the time-delay relay (TX) is closed to power the magnetic contactor (MC), turn on the operation indication lamp (LG) and send a running condition signal to the control unit (24).

The power supply indication circuit (50) is electrically connected to the N pole of the A/C source by the normally closed contact of the magnetic contactor (MC) and has a red power indicating light (LR).

The electric separating apparatus in accordance with the present invention is powered through the electrode panels (11, 11', 12, 12') to accelerate precipitation of the glycerol. Then, the glycerol in the separating tank (10, 10') can be separated from the liquid mixture made by transesterification quickly. In addition, the electric separating apparatus uses the electrode panels (11, 11', 12, 12') in the separating tank (10, 10') to separate the glycerol and the bio-diesel, a structure of the electric separating apparatus is simple so manufacturing bio-diesel is cheaper.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An electric separating apparatus having a separating tank having a bottom;

at least one first electrode panel mounted in the separating tank and each one of the at least one first electrode panel having a height;

an upper edge;

a lower edge extending to the bottom of the separating tank;

a second electrode panel mounted in the separating tank, parallel to the at least one first electrode panel and having a height being smaller than that of the at least one first electrode panel; and an upper edge; and a lower edge being above the lower edge of the first electrode panel;

an upper separating region formed in the separating tank between the upper edges of the electrode panels and the lower edge of the second electrode panel; and a lower separating region formed in the separating tank between the lower edge of the second electrode panel and the bottom of the separating tank; and an electrical control electrically connected to the electrode panels of the separating tank and having a transformer electrically connected to an A/C source and the electrode panels and having a first side electrically connected to the A/C source; and a second side electrically connected to the electrode panels;

a high-power resistor electrically connected to the second side of the transformer and the at least one first electrode panel in series and having two ends;

a first A/C transducer electrically connected to the ends of the high-power resistor to detect the voltage between the ends of the high-power resistor;

a second A/C transducer electrically connected to the electrode panels in series to detect the voltage between the electrode panels; and a control unit electrically connected to the A/C transducers to determine an electrical impedance of a liquid mixture made by transesterification and charged into the separating tank by receiving currents from the A/C transducers to selectively supply power to the transformer, and the control unit having a normally open contact.

2. The electric separating apparatus as claimed in claim 1, wherein the separating tank has multiple sidewalls formed with each other and each sidewall having a height being larger than that of the at least one first electrode panel;

a bottom edge formed with the bottom of the separating tank to form a volume for storing the liquid mixture; and a top edge; and an opening formed between the top edges of the sidewalls;

an inlet pipe mounted on one of the sidewalls of the separating tank near the opening, communicating with the separating regions of the separating tank to inject the liquid mixture into the separating tank;

a bio-diesel outlet mounted on the corresponding sidewall near the lower edge of the second electrode panel and communicating with the upper separating region; and a glycerol outlet mounted on the corresponding sidewall below the bio-diesel outlet and communicating with the lower separating region.

3. The electric separating apparatus as claimed in claim 2, wherein the electrode panels are mounted in the separating tank at intervals and the upper edges of the electrode panels are mounted near the opening of the separating tank.

4. The electric separating apparatus as claimed in claim 3, wherein the electrical control further has a thermal relay electrically connected to the second side of the transformer and the electrode panels and having a normally closed contact;

a magnetic contactor electrically connected to the second side of the transformer and the electrode panels in series with the thermal relay and having two ends and a normally closed contact;

a fault indication circuit electrically connected to an N pole of the A/C source by a middle relay and the normally closed contact of the thermal relay and having a coil, wherein the fault indication circuit sends a signal to the control unit when the coil is excited;

a magnetic contactor circuit electrically connected to the fault indication circuit and having a switch having an automation contact electrically connected to the N pole of the A/C source by the normally open contact of the control unit, the magnetic contactor and the normally closed contact of the thermal relay;

an off contact electrically connected to the N pole of the A/C source by a normally open contact of a time-delay relay, the magnetic contactor and the normally closed contact of the thermal relay; and a manipulating contact electrically connected to the time-delay relay; and a power supply indication circuit electrically connected to the N pole of the A/C source by the normally closed contact of the magnetic contactor.

5. The electric separating apparatus as claimed in claim 4, wherein the fault indication circuit has a fault indicator light electrically connected to the middle relay;

the magnetic contactor circuit has an operation indication lamp electrically connected to the ends of the magnetic contactor; and the power supply indication circuit has a red power indicating light.

6. The electric separating apparatus as claimed in claim 4, wherein the magnetic contactor has three contact segments, two of the contact segments of the magnetic contactor are connected to the second side of the transformer and the other contact segment is connected to an acousto-optic alarm.

7. The electric separating apparatus as claimed in claim 4, wherein the separating tank has two first electrode panels mounted in the separating tank; and the second electrode panel mounted in the separating tank between the first electrode panels.

* * * * *